US012675142B2

(12) United States Patent
Hong et al.

(10) Patent No.: US 12,675,142 B2
(45) Date of Patent: Jul. 7, 2026

(54) HINGE DEVICE OF PORTABLE TERMINAL WITH FOLDABLE STRUCTURE

(71) Applicant: FINE M-TEC CO., LTD., Anyang-si (KR)

(72) Inventors: Sung Chun Hong, Seoul (KR); Hyun Taek Jung, Seoul (KR); Chang Soo Kim, Incheon (KR)

(73) Assignee: FINE M-TEC CO., LTD., Anyang-si (KR)

( * ) Notice: Subject to any disclaimer, the term of this patent is extended or adjusted under 35 U.S.C. 154(b) by 375 days.

(21) Appl. No.: 18/034,036

(22) PCT Filed: Dec. 27, 2021

(86) PCT No.: PCT/KR2021/019922
§ 371 (c)(1),
(2) Date: Apr. 26, 2023

(87) PCT Pub. No.: WO2022/145917
PCT Pub. Date: Jul. 7, 2022

(65) Prior Publication Data
US 2023/0393632 A1      Dec. 7, 2023

(30) Foreign Application Priority Data
Dec. 29, 2020    (KR) ........................ 10-2020-0185606

(51) Int. Cl.
*G06F 1/16*            (2006.01)
(52) U.S. Cl.
CPC .................................. *G06F 1/1681* (2013.01)
(58) Field of Classification Search
CPC ................................ H05K 7/00; G06F 1/1681
See application file for complete search history.

(56) References Cited

U.S. PATENT DOCUMENTS 8,976,519 B2 *    3/2015  Lai ........................ G06F 1/1607
                                                        248/922
10,070,546 B1 *   9/2018  Hsu ........................... E05D 7/00
                        (Continued)

FOREIGN PATENT DOCUMENTS

CN          111816067 A      10/2020
CN          112041781 A      12/2020
                    (Continued)

*Primary Examiner* — Imani N Hayman
*Assistant Examiner* — Rashen E Morrison
(74) *Attorney, Agent, or Firm* — NKL LAW; Jae Youn Kim

(57)            ABSTRACT

A hinge device of a portable terminal with a foldable structure according to the present invention is characterized by comprising: housing positioned between one end of a first body and one end of a second body; first hinge blade and second hinge blade fixed to the first body and the second body, respectively, and supported by the housing to rotate at a predetermined angle between an 'unfolded position' in which the first body and the second body are placed on the same horizontal line and a 'folded position' in which the first body and the second body face each other and come into contact with each other; and link lever for interlocking the first hinge blade and the second hinge blade with each other so that the first hinge blade and the second hinge blade move relative to each other, wherein the first hinge blade and the second hinge blade have first inclined link groove and second inclined link groove formed on the undersides thereof, and correspondingly thereto, the link lever has first link protrusion and second link protrusion formed on tops thereof, the link lever being disposed rotatably to a predetermined angle in the housing.

9 Claims, 11 Drawing Sheets

(56)                           References Cited

U.S. PATENT DOCUMENTS

| | | | | |
|---|---|---|---|---|
| 10,520,988 B2 * | 12/2019 | Hsu | ...................... | G06F 1/1618 |
| 11,224,137 B2 * | 1/2022 | Hsu | ..................... | E05D 11/0081 |
| 11,516,323 B2 * | 11/2022 | Jung | ................... | H04M 1/0216 |
| 11,516,324 B2 * | 11/2022 | Park | ...................... | G06F 1/1681 |
| 11,596,074 B2 * | 2/2023 | Park | ...................... | G06F 1/1681 |
| 11,625,073 B2 * | 4/2023 | Shim | ..................... | G06F 1/1652 |
| | | | | 361/679.28 |
| 11,644,874 B2 * | 5/2023 | Kuramochi | ........... | G06F 1/1641 |
| | | | | 361/679.27 |
| 11,775,029 B2 * | 10/2023 | Yuan | ....................... | G06F 1/181 |
| | | | | 361/679.27 |
| 11,800,669 B2 * | 10/2023 | Lin | ....................... | G06F 1/1681 |
| 11,924,987 B2 * | 3/2024 | Lee | ....................... | H04M 1/022 |
| 2020/0267856 A1 * | 8/2020 | Hsu | ....................... | G06F 1/1652 |

FOREIGN PATENT DOCUMENTS

| | | | | | |
|---|---|---|---|---|---|
| KR | 2012-0000197 A | | 1/2012 | | |
| KR | 20200109722 A | * | 3/2019 | ........... | G06F 1/1681 |
| KR | 10-2019-0110244 A | | 9/2019 | | |
| KR | 10-2019-0124110 A | | 11/2019 | | |
| KR | 10-2020-0005148 A | | 1/2020 | | |
| KR | 10-2020-0109722 A | | 9/2020 | | |
| KR | 10-2020-0120474 A | | 10/2020 | | |

* cited by examiner

55(56)          53(54)

55(56)          53(54)

HINGE DEVICE OF PORTABLE TERMINAL WITH FOLDABLE STRUCTURE

TECHNICAL FIELD

The present invention relates to a hinge device for a portable terminal with a foldable structure, and more specifically, to a hinge device for a portable terminal with a foldable structure that is configured to be disposed on the portable terminal to which a flexible display is applied, thereby having an improvement in the foldable structure in which the flexible display is stably folded and unfolded.

BACKGROUND ART

Portable terminals are devices that are carried with users, while each having a battery and a display part to thus output information to the display part using the power supplied from the battery.

The portable terminal includes a device for recording and playing videos and a device for displaying graphic user interface (GUI), and examples of the portable terminals include laptops, smartphones, glasses and watches with which screen information is displayed, game machines, and the like.

As the functions of the portable terminals become diverse, further, the portable terminals are functioned as multimedia players having multi-functions such as picture or video taking, music or video file reproducing, game playing, broadcasting receiving, and the like.

To support and increase the functions of the portable terminals, improvements in structures and/or software of the portable terminals may be required.

Further, the portable terminals are developed with various designs, and so as to satisfy the needs of users for newer and more different designs, endeavors for developing the portable terminals to new shapes have been made.

In this case, the new shapes include structural changes and improvements in the portable terminals so as to allow the portable terminals to be more conveniently used by the users.

As one of the structural changes and improvements, a portable terminal whose at least a portion of the display part is bendable or foldable is in the limelight.

However, a complicated configuration is needed in supplying power or external force required to allow the portable terminal to be bent or folded, thereby disadvantageously making an outer appearance of the portable terminal not simple and causing the thickness of the portable terminal to increase.

When a flexible display panel is folded, further, it is changed in length, and accordingly, a hinge device used for a conventional folder portable terminal cannot be used.

Besides, most of conventional hinge devices applied to the flexible display panel are configured to have an interlocking structure in which two bodies move relative to each other, using gears that simply interlock with each other in rotating directions of the bodies (See Korean Patent Application Laid-open No. 10-2019-0124110). However, the interlocking structure may be lowered in durability, generate vibrations or noise, have complicated manufacturing processes, and increase component costs.

Therefore, there is an urgent need for developing a hinge device for a portable terminal that has a new and efficient folding structure capable of equally folding both ends of a flexible display panel to the same angle to each other to thus handle changes in length of the flexible display panel.

DISCLOSURE

Technical Problem

Accordingly, the present invention has been made in view of the above-mentioned problems occurring in the related art, and it is an object of the present invention to provide a hinge device for a portable terminal with a foldable structure that is capable of improving durability, reducing vibrations or noise, being simple in a manufacturing process, and lowering component costs.

Technical Solution

To accomplish the above-mentioned objects, according to the present invention, a hinge device for a portable terminal with a foldable structure may include: housing positioned between one end of a first body and one end of a second body; first hinge blade and second hinge blade fixed to the first body and the second body, respectively, and supported by the housing to rotate at a predetermined angle between an 'unfolded position' in which the first body and the second body are placed on the same horizontal line and a 'folded position' in which the first body and the second body face each other and come into contact with each other; and link lever for interlocking the first hinge blade and the second hinge blade with each other so that the first hinge blade and the second hinge blade move relative to each other, wherein the first hinge blade and the second hinge blade have first inclined link groove and second inclined link groove formed on the undersides thereof, and correspondingly thereto, the link lever has first link protrusion and second link protrusion formed on tops thereof, the link lever being disposed rotatably to a predetermined angle in the housing.

According to the present invention, further, first inclined link groove and second inclined link groove may be rectangular inclinedly in the same directions as each other with respect to the rotation center of the corresponding link lever.

According to the present invention, moreover, the first inclined link groove and the second inclined link groove and portions on which the first inclined link groove and second inclined link groove are formed may be curvedly formed toward the rotating directions of the first hinge blade and the second hinge blade.

According to the present invention, further, link lever has a shaft hole formed at the center thereof and thus fitted to a lever shaft formed on the corresponding housing so that the link lever is rotatable by the predetermined angle around the lever shaft.

According to the present invention, besides, the first link protrusion and the second link protrusion become reduced in width toward tops thereof.

According to the present invention, moreover, a pair of semi-circular protrusions may be formed on the inner wall surfaces of both sides of the housing, and semi-circular grooves may be formed on the first hinge blade and second hinge blade, respectively, to be rotated by fitting the semi-circular protrusions thereto.

According to the present invention, further, each pair of semi-circular protrusions may be spaced apart from each other by a predetermined distance to allow a predetermined curvature radius formed on a folding portion of a flexible display panel to be accommodated in the predetermined distance at the 'folding position'.

According to the present invention, the hinge device may further include tension mechanism having a tension fixing member having a first guide shaft and a second guide shaft disposed thereon in the direction of the hinge axial line, a first tension blade and a second tension blade fitted to the first guide shaft and the second guide shaft, rotating supportedly thereagainst, and movable to axial directions, tension operating members movably fitted to the first guide shaft and the second guide shaft in the axial directions, and elastic members for applying elastic forces to the tension operating members.

According to the present invention, further, a plurality of inclined protrusions may be formed on the tension operating members in circumferential direction around the first guide shaft and the second guide shaft, and another plurality of inclined protrusions that can be fitted corresponding to the inclined protrusions may be formed on the first tension blade and the second tension blade.

According to the present invention, further, the tension mechanism may have tension guide protrusions protruding from the first tension blade and the second tension blade, respectively, and the tension guide protrusions are inserted into and guided in rectangular tension guide holes formed on one side of the first and second hinge blades.

According to the present invention, the hinge device may further include elastic members elastically installed at the interlocking portions between the first and the second hinge blade and the first and the second tension blade, and located furthest from the rotation axis of the first tension blade and the second tension blade.

Advantageous Effects

According to the present invention, the hinge device is configured to allow the first and second bodies to interlock with each other by means of the link levers rotating to the predetermined angle upon the folding operation of the portable terminal and thus perform the folding operation, thereby distributing the load occurring upon the folding operation to gently interlock the first and second bodies with each other and to reduce vibrations and noise generated and being simplified in the interlocking structure to achieve the improvement of durability, the reduction of component costs, and the simplification of a manufacturing process.

According to the present invention, further, the tension mechanism is provided interlockingly with the hinge blades upon the rotation of the hinge blades, thereby distributing the load applied to the hinge blades to prevent the hinge blades from being broken due to high loads and decreasing the gap occurring upon the folding operation to suppress the occurrence of vibrations and noise.

EXPLANATIONS OF REFERENCE NUMERALS

Figure 1:
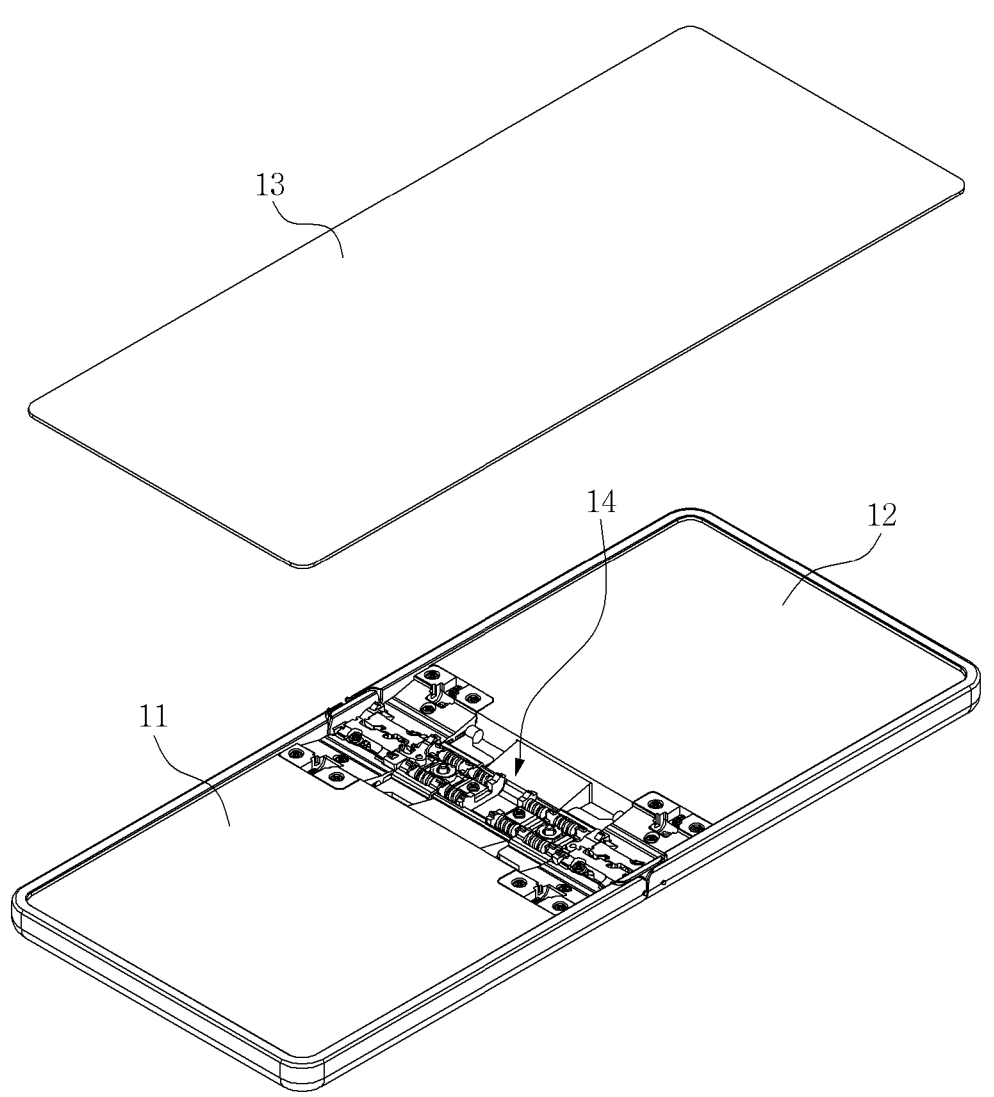
FIG. 1 is a perspective view showing a state where a flexible display panel is separated from a first body and a second body at a position where a portable terminal is unfolded according to the present invention.

11, 12: First and second bodies 13: Flexible display panel
14: Hinge device 21, 22: First and second hinge blades
31: Housing 41: Link lever
41a, 41b: First and second link protrusions 44a, 44b: First and second inclined link grooves
50: Tension mechanism 53, 54: Tension operating members
55, 56: First and second tension blades

BEST MODE FOR INVENTION

Hereinafter, the present invention will now be described in detail with reference to the attached drawings. Embodiments of the present invention as will be discussed later will be in detail described so that it may be carried out easily by those having ordinary skill in the art. It should be understood that the embodiments of the present invention are different from one another but not mutually exclusive. For example, specific shapes, structures, and characteristics described in an embodiment of the present invention may be adopted in another embodiment of the present invention without departing from the spirit and scope of the invention. Further, it should be understood that the positions or arrangements of the individual components in the embodiments disclosed of the invention are changed without departing from the spirit and scope of the invention. This application is intended to cover any adaptations or variations of the present invention. Therefore, it is manifestly intended that this invention be limited only by the claims and the equivalents thereof. In the description, it should be noted that the parts corresponding to those of the drawings are indicated by corresponding reference numerals.

Hereinafter, an explanation of a hinge device according to the present invention will be given in detail with reference to the attached drawings.

FIG. 1 is a perspective view showing a state where a flexible display panel 13 is separated from first and second bodies 11 and 12 at a position where a portable terminal is unfolded according to an embodiment of the present invention, and in this case, a hinge device 14 is connected and installed between one end facing a folding portion of the first body 11 and the second body 12.

The flexible display panel 13 has a given size so that it can cover the entire area of the first and second bodies 11 and 12 including the hinge device 14, and further, the flexible display panel 13 is fixed to inner surfaces of the first and second bodies 11 and 12 excepting the hinge device 14 through attaching means such as an adhesive and the like.

Figure 2:
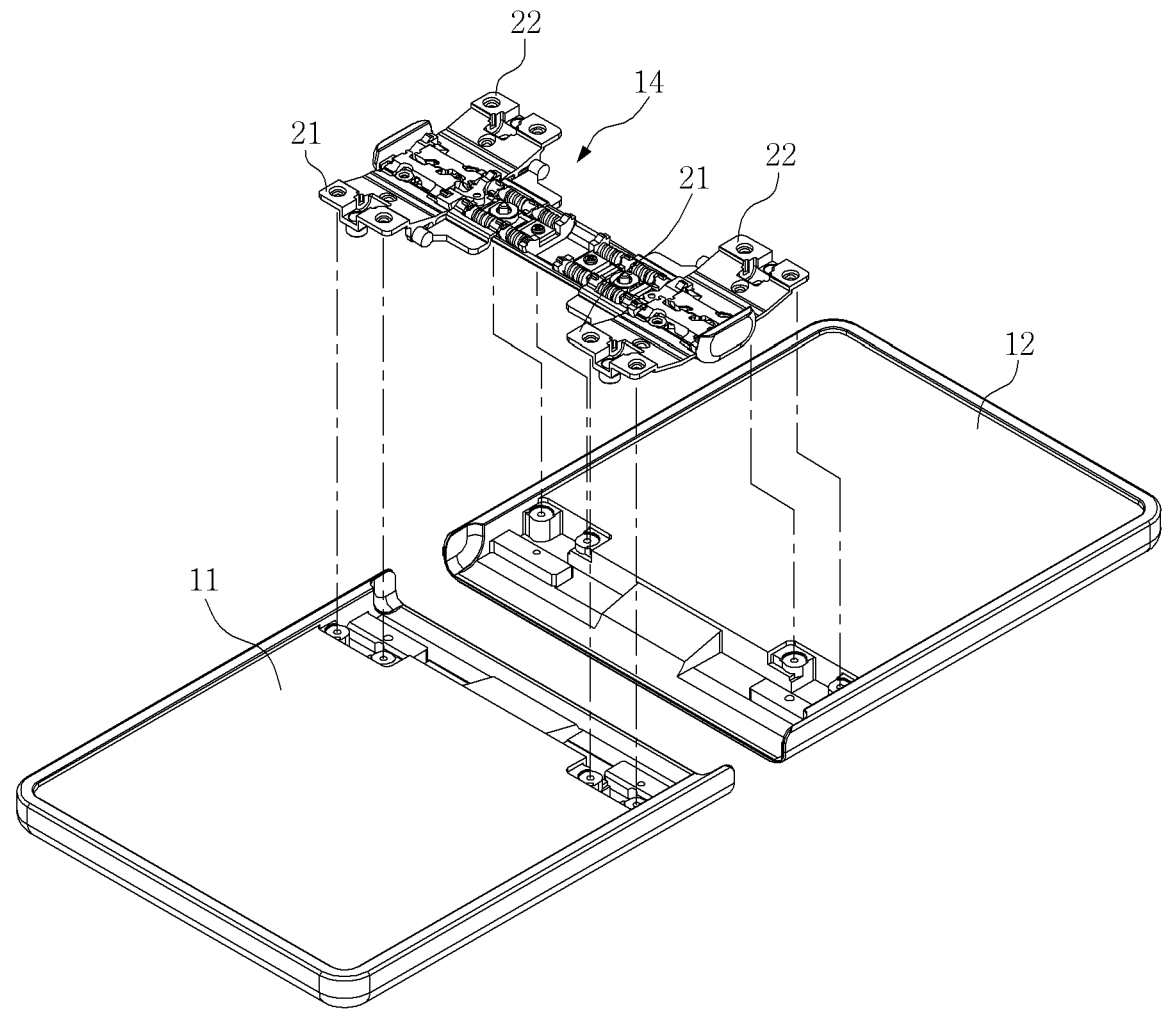
FIG. 2 is a perspective view showing a coupling relation of a hinge device according to the present invention to the first and second bodies of FIG. 1.

FIG. 2 is a perspective view showing a coupling relation of the hinge device 14 according to the present invention to the first and second bodies 11 and 12, and in this case, the hinge device 14 includes first hinge blades 21 and second hinge blades 22 fixed to the first body 11 and the second body 12 by means of screws (not shown), so that the hinge device 14 is fixed to the first and second bodies 11 and 12.

Figure 3:
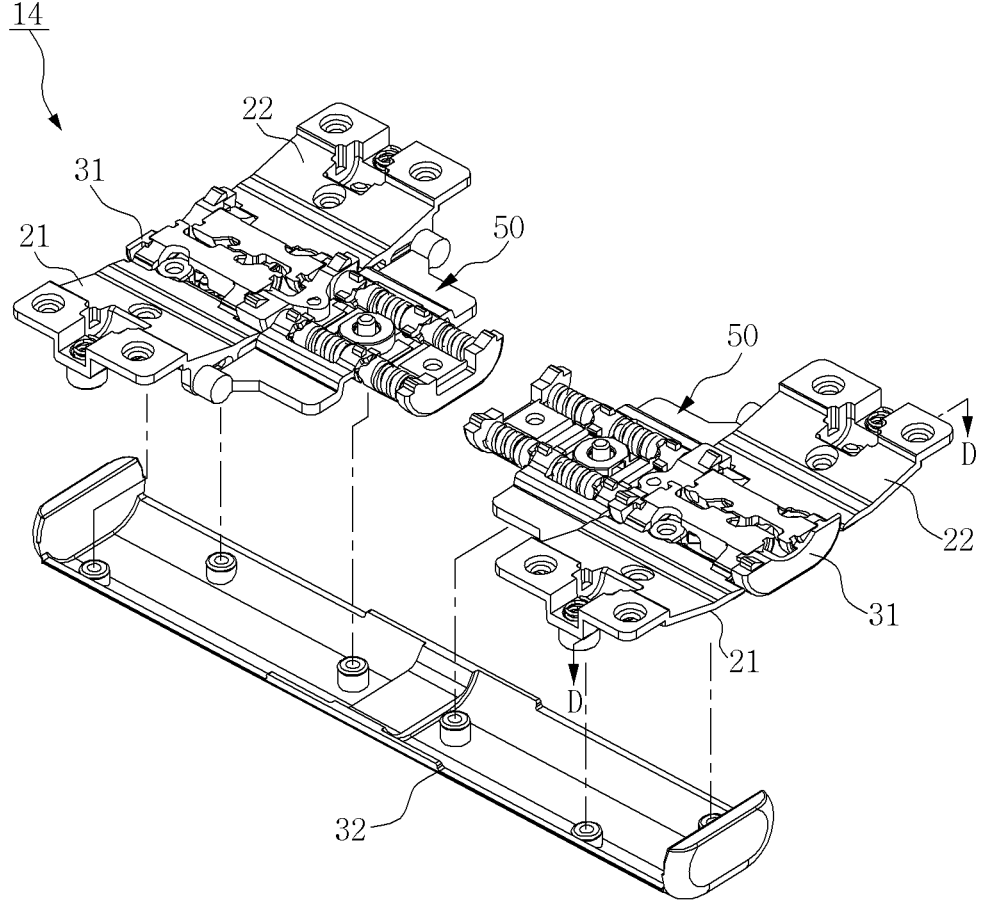
FIG. 3 is an exploded perspective view showing main components of the hinge device according to the present invention.

FIG. 3 is an exploded perspective view showing main components of the hinge device 14 according to the present invention. As shown, the hinge device 14 includes housing 31 adapted to mount the first and second hinge blades 21 and 22 thereon to supportingly rotate the first and second hinge blades 21 and 22 between an 'unfolding position' and a 'folding position' of the first and second bodies 11 and 12 and tension mechanism 50 adapted to perform free-stop functions between the 'unfolding position' and the 'folding position' while the first and second hinge blades 21 and 22 are rotating.

The first and second hinge blades 21 and 22, the housing 31, and the tension mechanism 50 are provided in pair so that the respective pairs have the same configuration as each other on both ends of the first and second bodies 11 and 12 connected to each other, thereby allowing the first and second bodies 11 and 12 to be stably folded and unfolded. In this case, the housing 31 and the tension mechanism 50 are fixed to a single hinge cover 32 by means of screws (not shown).

Figure 4:
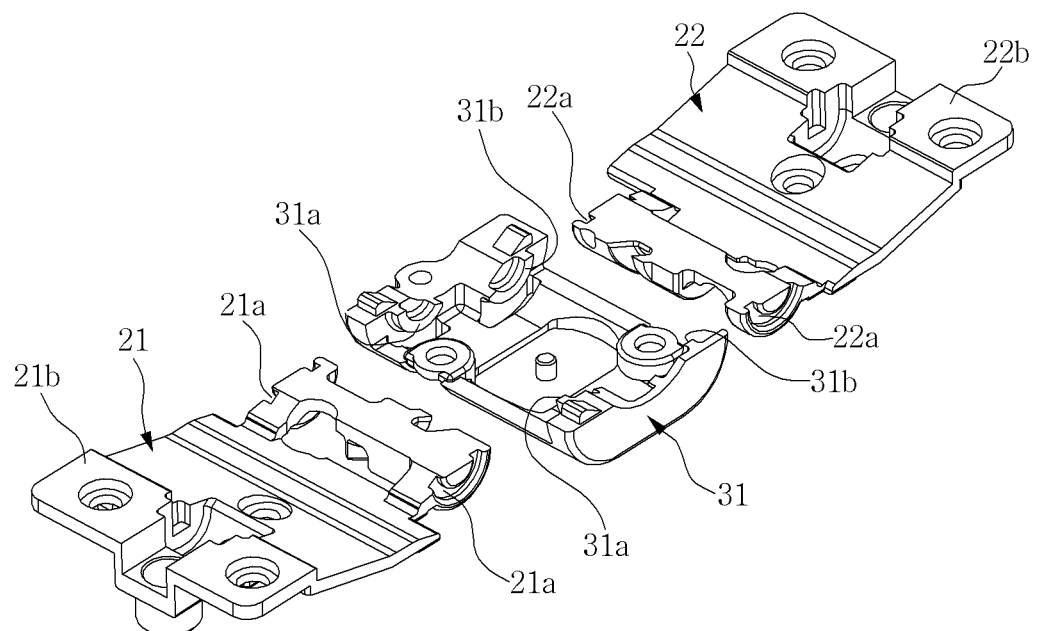
FIG. 4 is an exploded perspective view showing first and second hinge blades and a housing as a rotation-supporting structure in the hinge device according to the present invention

FIGS. 4, 5_a_ and 5_b_ show a rotation-supporting structure of the first and second hinge blades 21 and 22 of the hinge device 14 according to the present invention. FIGS. 5_a_ and 5_b_ are sectional views taken along the line D-D of FIG. 3, but so as to easily explain the rotation-supporting structure of the first and second hinge blades 21 and 22 as shown in FIG. 4, the sections of some components are omitted. As shown, the rotation-supporting structure of the first and second hinge blades 21 and 22 includes a pair of semi-circular protrusions 31_a_ and a pair of semi-circular protrusions 31_b_ spaced apart from each other by a predetermined distance on the inner wall surfaces of both sides of housing 31 and semi-circular grooves 21_a_ and 22_a_ to which the semi-circular protrusions 31_a_ and 31_b_ are fitted so that the first and second hinge blades 21 and 22 supportedly rotate.

The semi-circular grooves 21_a_ and 22_a_ of the first and second hinge blades 21 and 22 are formed on the opposite ends to fixing portions 21_b_ and 22_b_ to which the first and second bodies 11 and 12 are fixed, so that the fixing portions 21_b_ and 22_b_ rotate to a predetermined angle around the semi-circular grooves 21_a_ and 22_a_ to allow the first and second bodies 11 and 12 to supportingly rotate between the 'unfolding position' and the 'folding position'.

In this case, a distance between the semi-circular protrusions 31_a_ and 31_b_ is set to allow a folding space in which a predetermined curvature radius formed on a folding portion of the flexible display panel 13 at the 'folding position' is accommodated to be formed between the first and second hinge blades 21 and 22.

According to the present invention, the semi-circular grooves 21_a_ and 22_a_ are formed on the first and second hinge blades 21 and 22, and the semi-circular protrusions 31_a_ and 31_b_ are formed on the housing 31. However, of course, the semi-circular protrusions 31_a_ and 31_b_ may be formed on the first and second hinge blades 21 and 22, and the semi-circular grooves 21_a_ and 22_a_ may be formed on the housing 31.

An explanation of the rotation-supporting structure of the first and second hinge blades 21 and 22 have been given in the above, but any structure capable of supportingly rotating the bodies 11 and 12 may be coupled to interlocking means as will be discussed later and thus applied to the present invention.

Figure 6:
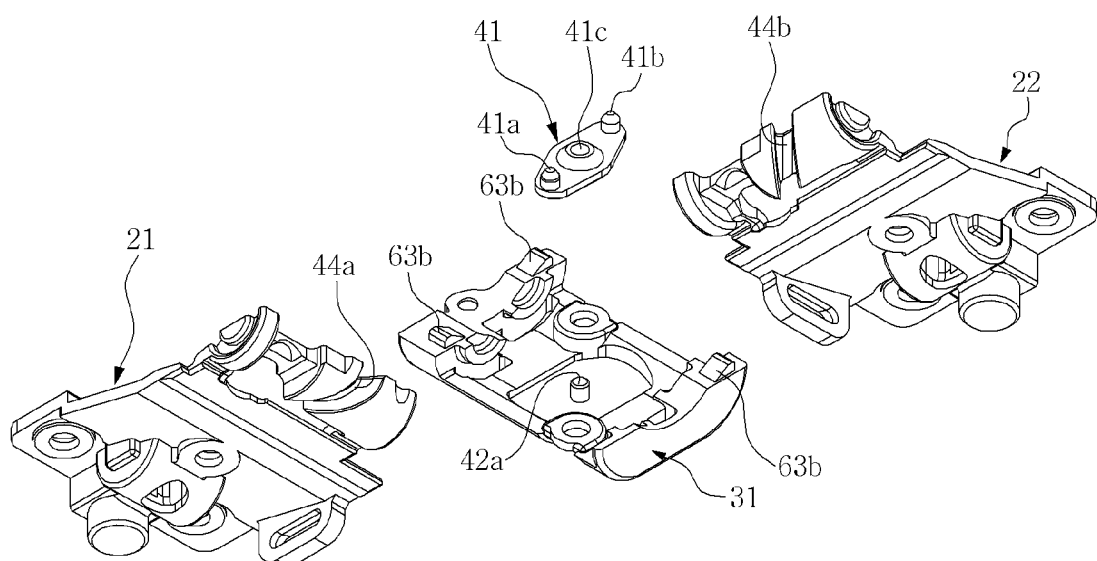
FIG. 6 is an exploded perspective view showing an interlocking structure between the first and second hinge blades and a link lever of the hinge device according to the present invention.

FIG. 6 shows the first and second hinge blades 21 and 22, the housing 31, and a link lever 41, and in this case, the link lever 41 as the interlocking means for moving the first hinge blade 21 and the second hinge blade 22 relatively to each other is located on the housing 31.

The link lever 41 is located between undersides of the first and second hinge blades 21 and 22 and top of the housing 31. The link lever 41 has a shaft hole 41_c_ formed at the center thereof and thus fitted to a lever shaft 42_a_ formed on the housing 31 so that the link lever 41 is rotatable by a predetermined angle around the lever shaft 42_a_.

Further, the link lever 41 has first and second link protrusions 41_a_ and 41_b_ protruding from tops of both ends thereof, and the first hinge blade 21 and the second hinge blade 22 have a first inclined link groove 44_a_ and a second inclined link groove 44_b_ formed on the undersides thereof to guide the first and second link protrusions 41_a_ and 41_b_ therealong.

The first inclined link groove 44_a_ and a second inclined link groove 44_b_ and the portions including them on the undersides of the first hinge blade 21 and the second hinge blade 22 are curvedly formed toward the rotation directions of the first hinge blade 21 and the second hinge blade 22.

Further, the first inclined link groove 44_a_ and the second inclined link groove 44_b_, which are formed on the first hinge blade 21 and the second hinge blade 22, are rectangular inclinedly and curvedly therealong in the same direction as each other with respect to the rotation center of the link lever 31.

The first and second link protrusions 41_a_ and 41_b_ interlocking with the first and second inclined link grooves 44_a_ and 44_b_ desirably become reduced in width toward tops thereof, so that when they interlock with the first and second inclined link grooves 44_a_ and 44_b_, friction forces are decreased to suppress the occurrence of vibrations and noise.

According to the interlocking structure of the first and second hinge blades 21 and 22, the first and second link protrusions 41_a_ and 41_b_ interlock with the first and second inclined link grooves 44_a_ and 44_b_ to allow the rotations of the first and second hinge blades 21 and 22 to interlock with the rotation of the link lever 41, so that even if only one of the first and second hinge blades 21 and 22 rotates to the 'folding position' or the 'unfolding position', the other hinge blade moves relative to one hinge blade in the opposite direction to the rotation direction of one hinge blade and rotates to the 'folding position' or the 'unfolding position', together with one hinge blade.

Figure 8:
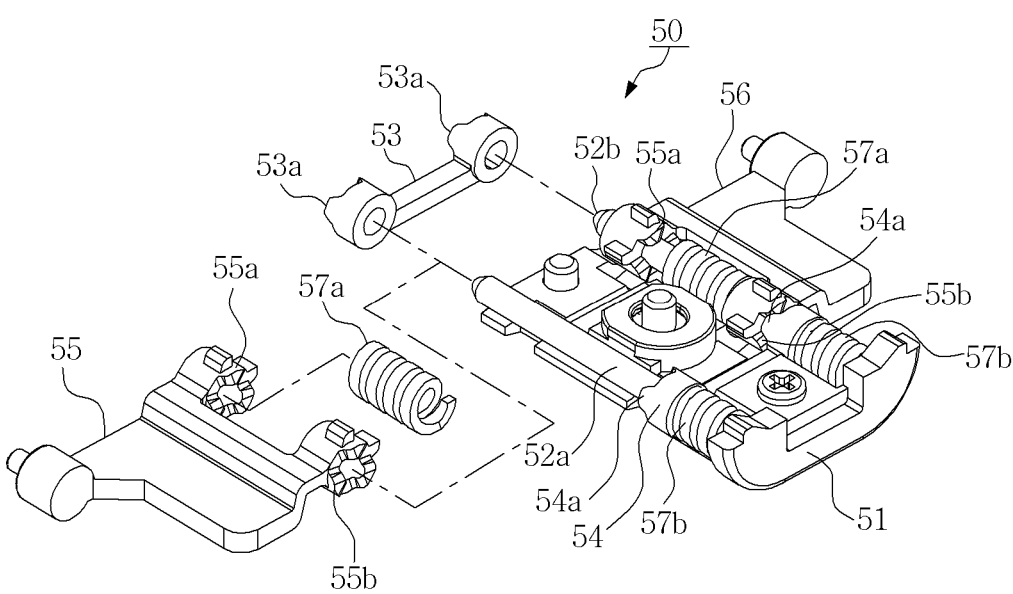
FIG. 8 is an exploded perspective view showing a tension mechanism of the hinge device according to the present invention.

FIG. 8 is a partially exploded perspective view showing the tension mechanism 50 separated from the hinge device 14 according to the present invention.

As shown, the tension mechanism 50 includes a tension fixing member 51 fixed to the hinge cover 32 (See FIG. 3) and having first and second guide shafts 52_a_ and 52_b_ disposed thereon in the direction of a hinge axial line. Further, the tension mechanism 50 includes tension operating members 53 and 54 movably fitted to the first and second guide shafts 52*a* and 52*b* in axial directions and having a plurality of inclined protrusions 53*a* and 54*a* protruding in the direction of the hinge axial line therefrom in circumferential directions around the first and second guide shafts 52*a* and 52*b*.

Further, the tension mechanism 50 includes first and second tension blades 55 and 56 fitted to the first and second guide shafts 52*a* and 52*b*, rotating supportedly thereagainst, and movable to the axial directions. The first and second tension blades 55 and 56 have inclined protrusions 55*a* and 55*b* fitted to the spaces of the inclined protrusions 53*a* and 54*a* of the tension operating members 53 and 54 corresponding thereto.

Further, first springs 57*a* as an elastic members are located at spaces between the tension operating member 53 and the first tension blade 55 and the tension operating member 53 and the second tension blade 56, and second springs 57*b* as an elastic members are located at spaces between the tension operating member 54 and the tension fixing member 51. The first and second springs 57*a* and 57*b* serve to constantly apply elastic forces so that the inclined protrusions 53*a* and 54*a* of the tension operating members 53 and 54 are fitted to the inclined protrusions 55*a* and 55*b* of the first and second tension blades 55 and 56.

Figure 9:
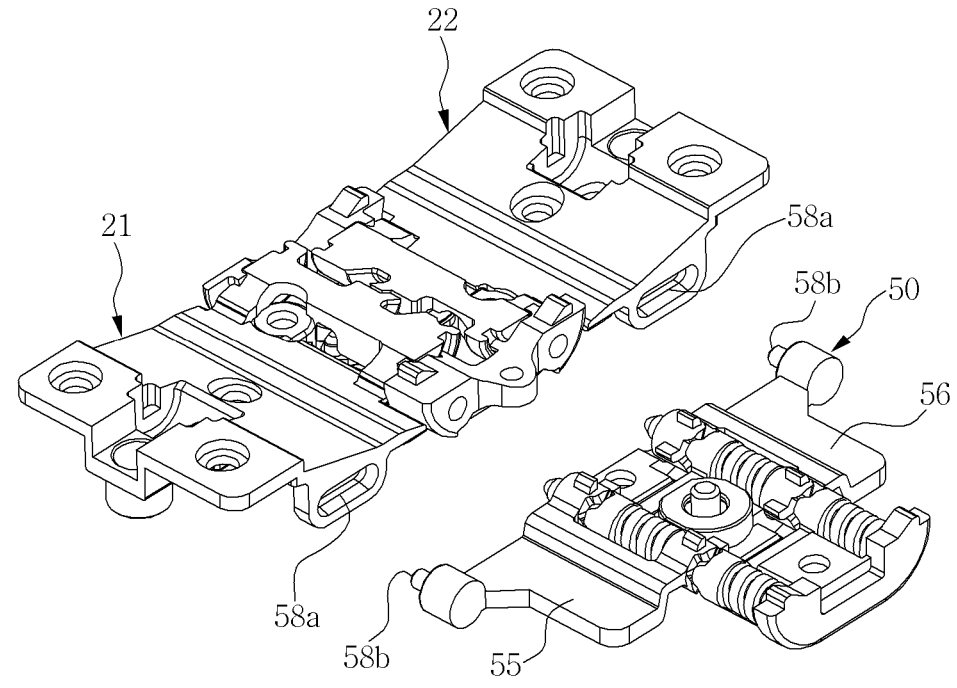
FIG. 9 is an exploded perspective view showing a connection structure between the tension mechanism and the first and second hinge blades of the hinge device according to the present invention.

FIG. 9 shows a connection structure between the tension mechanism 50 and the first and second hinge blades 21 and 22, and the connection structure includes rectangular tension guide holes 58*a* formed on one side of the first and second hinge blades 21 and 22 and tension guide protrusions 58*b* protruding from the first and second tension blades 55 and 56 of the tension mechanism 50 and thus guidedly fitted to the tension guide holes 58*a*.

Accordingly, the first and second tension blades 55 and 56 of the tension mechanism 50 interlock with the first and second hinge blades 21 and 22 and thus rotate between the 'unfolding position' and the 'folding position', together with the first and second hinge blades 21 and 22. In this case, the tension guide protrusions 58*b* formed on the first and second tension blades 55 and 56 rotating around the first and second guide shafts 52*a* and 52*b* slidably move along the rectangular tension guide holes 58*a* formed on the first and second hinge blades 21 and 22, so that while the first and second tension blades 55 and 56 are rotating between the 'unfolding position' and the 'folding position', they rotate interlockingly with the first and second hinge blades 21 and 22 moving relative to each other.

The tension mechanism 50 is configured to allow the inclined protrusions 55*a* and 55*b* of the first and second tension blades 55 and 56 to be fitted or escape to or from the inclined protrusions 53*a* and 54*a* of the tension operating members 53 and 54 according to the rotations of the first and second tension blades 55 and 56 (See FIGS. 11*a* and 11*b*), so that the elastic forces of the first and second springs 57*a* and 57*b* are increased or decreased to cause the rotations of the first and second bodies 11 and 12 to be easily performed with small forces at the 'unfolding position' or the 'folding position', while the free-stop function is being performed between the 'unfolding position' and the 'folding position'.

If the rotating force is removed during the rotations of the first and second bodies 11 and 12 to the 'unfolding position' or the 'folding position' to thus stop the rotations, the free-stop function enables the first and second bodies 11 and 12 to be kept at the positions where the rotations are stopped.

Figure 11A:
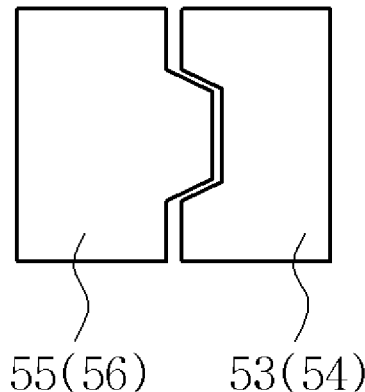
FIGS. 11a and 11b are views showing the operating states of the tension mechanism of the hinge device according to the present invention.
Figure 11B:
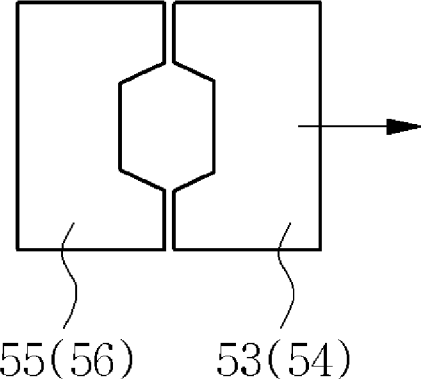

If the maximum curved portions of the inclined protrusions 53*a* and 54*a* of the tension operating members 53 and 54 are located in positions to face the maximum curved portions of the inclined protrusions 55*a* and 55*b* of the first and second tension blades 55 and 56 according to the rotations of the first and second tension blades 55 and 56, the first and second springs 57*a* and 57*b* are compressed so that through the compressed elastic forces, the free-stop function is performed to allow the first and second bodies 11 and 12 to be kept at the positions where the rotations are stopped (See FIGS. 11*a* and 11*b*).

Figure 10:
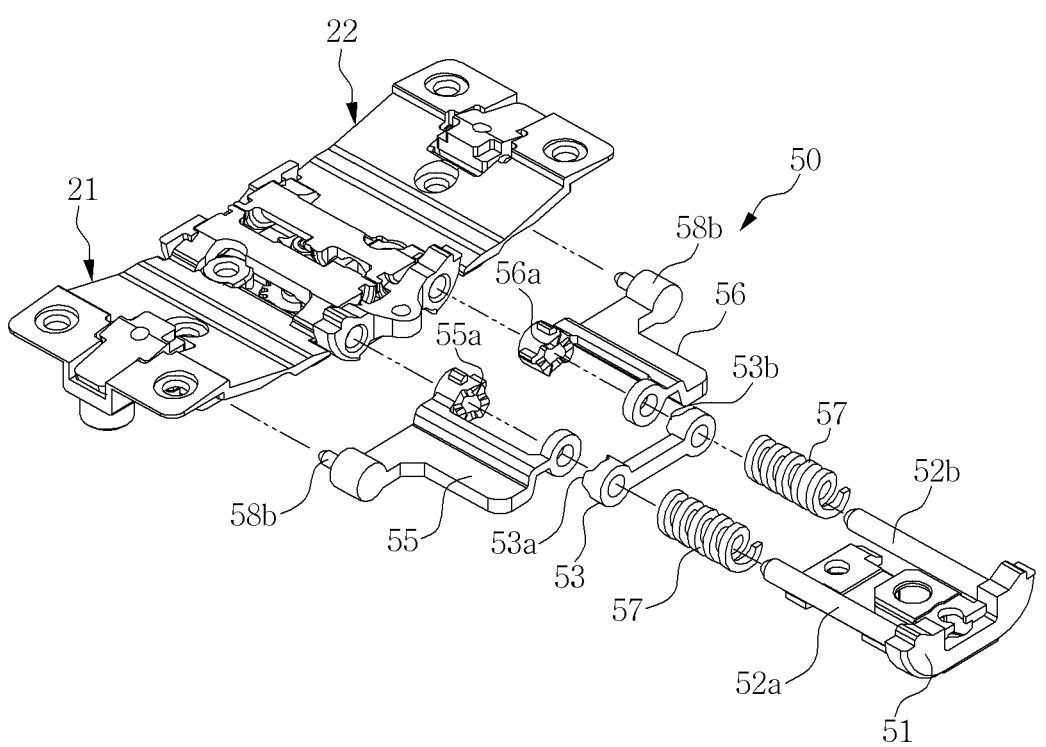
FIG. 10 is an exploded perspective view showing another example of the tension mechanism of the hinge device according to the present invention.

FIG. 10 is an exploded perspective view showing another example of the tension mechanism of the hinge device according to the present invention. Unlike the tension mechanism as shown in FIG. 8, the tension mechanism as shown in FIG. 10 has only the springs 57 located between the tension operating member 53 and the tension fixing member 51, thereby allowing a distance between both sides of the hinge device to increase. Accordingly, it is easy to locate signal wires and the hinge device is simple in configuration to improve the assemblability and durability thereof. Further, springs 59 are additionally fitted to the tension guide protrusions 58*b* of the first and second tension blades 55 and 56 to allow the first and second hinge blades 21 and 22 to elastically come into close contact with the first and second tension blades 55 and 56. As a result, the springs 59 are located on the interlocking portions most distant from the rotary axial lines of the first and second tension blades 55 and 56, thereby more increasing the elastic forces with respect to the rotary torques of the first and second tension blades 55 and 56 when compared with the elastic forces of springs 59 located sequentially to the springs 57 on the rotary axial lines. Further, the elastic forces collected to the rotary axial lines are distributed to improve the stability and durability of the tension mechanism 50.

An explanation of the tension mechanism 50 has been given above, but only if any device easily rotates the bodies 11 and 12 with a small force and performs the free-stop function, it may be coupled to the interlocking means as mentioned above and thus applied to the present invention.

Now, an explanation of the operations of the hinge device according to the present invention will be given.

Figure 5A:
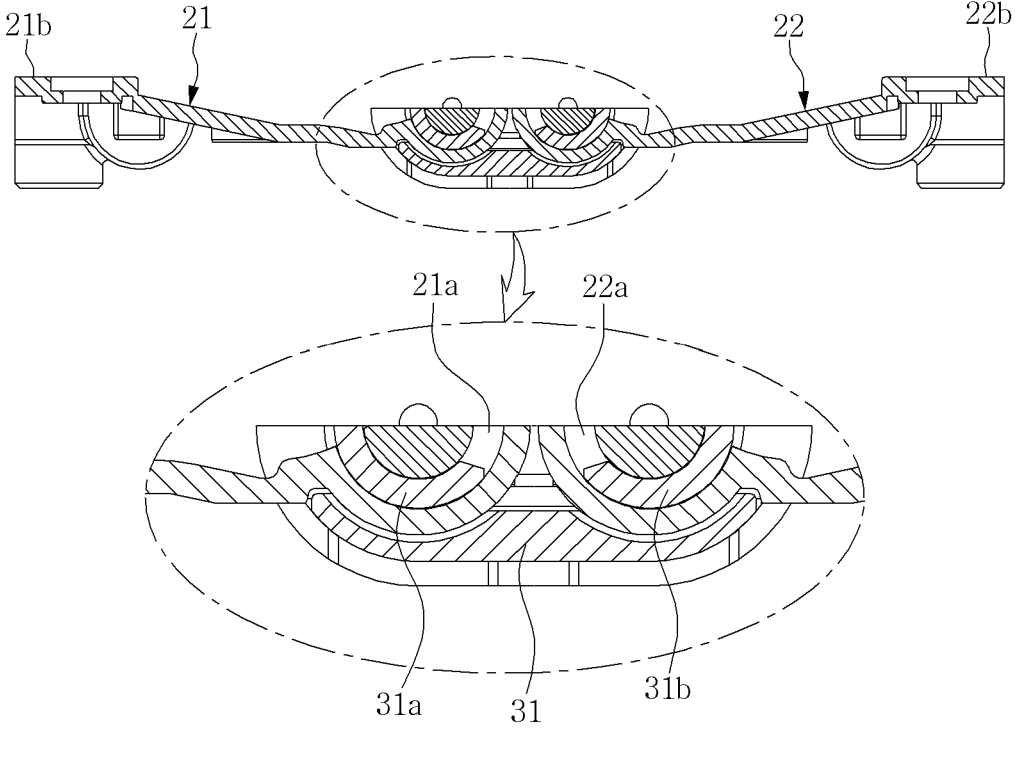
FIGS. 5a and 5b are sectional views taken along the line D-D of FIG. 3, which show the rotation-supporting structure of the first and second hinge blades of FIG. 4.
Figure 5B:
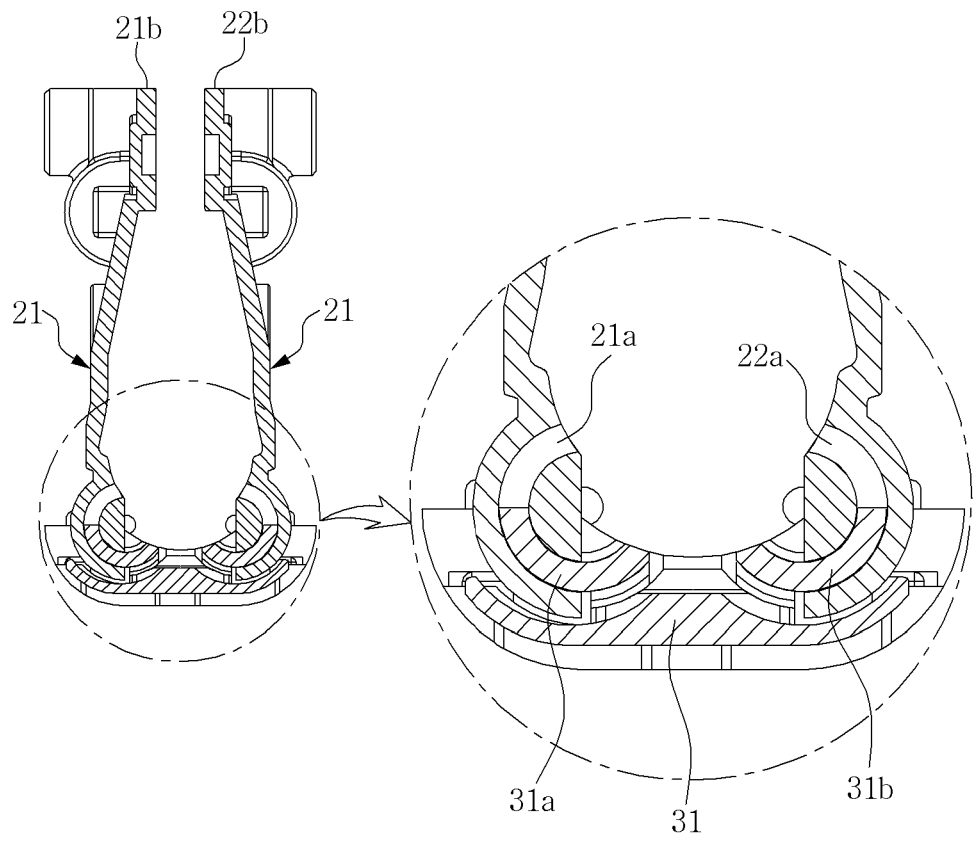

If the first and second bodies 11 and 12 move between the unfolding position and the folding position, as shown in FIGS. 5*a* and 5*b*, the semi-circular grooves 21*a* and 22*a* of the first and second hinge blades 21 and 22 fixed to the first and second bodies 11 and 12 are guided by the semi-circular protrusions 31*a* and 31*b* of the housing 31 and thus supportedly rotate, so that the operations for moving the first and second bodies 11 and 12 between the 'unfolding position' and the 'folding position' may be gently performed.

Further, even though only one of the first body 11 and the second body 12 rotates, the other body moves relatively to one body and thus rotates together with the rotating body through the interlocking means.

Figure 7A:
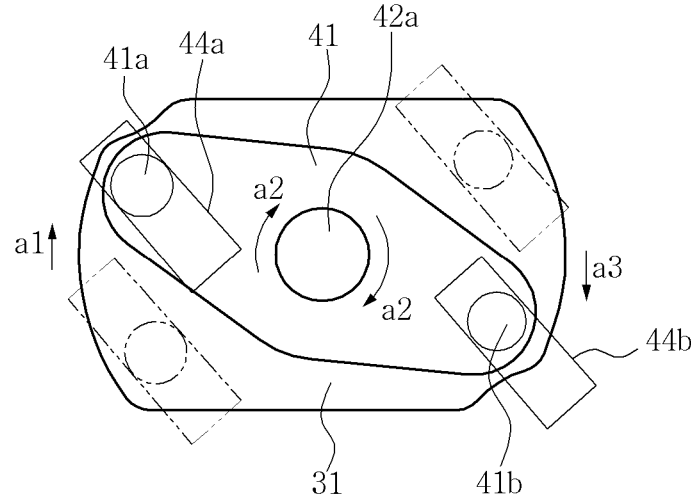
FIGS. 7a and 7b are views showing operating states of the link lever of the hinge device according to the present invention.

In specific, as shown in FIG. 7*a*, if only the first hinge blade 21 rotates to the 'unfolding position' to allow the first inclined guide link groove 44*a* of the first hinge blade 21 to move to a direction of an arrow 'a1' from an imaginary line, the link lever 41 rotates to a direction of an arrow 'a2' by means of the first link protrusion 41*a* guided by the first inclined link groove 44*a*, so that as the second inclined link groove 44*b* of the second hinge blade 22 moves to a direction of an arrow 'a3' from an imaginary line, the second hinge blade 22 moves to the 'unfolding position', together with the first hinge blade 21.

Contrarily, even if the second inclined link groove 44*b* of the second hinge blade 22 moves to the direction of the arrow 'a3', the first inclined link groove 44*a* of the first hinge blade 21 moves to the direction of the arrow 'a1' by means of the first and second link protrusions 41*a* and 41*b* of the link lever 41, and accordingly, the first hinge blade 21 does not move, together with the second hinge blade 22.

Figure 7B:
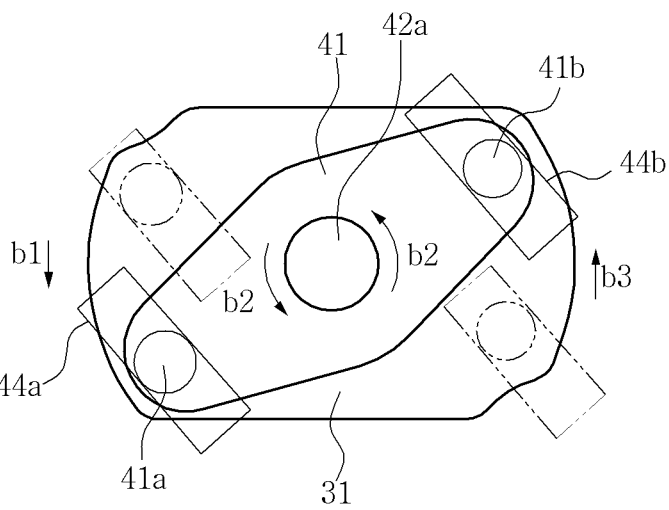

In the same manner as above, as shown in FIG. 7*b*, if only the first hinge blade 21 rotates to the 'folding position' to allow the first inclined link groove 44*a* of the first hinge blade 21 to move to a direction of an arrow 'b1' from an imaginary line, the link lever 41 rotates to a direction of an arrow 'b2' by means of the first link protrusion 41*a* and further, the second link protrusion 41*b* rotates to the direction of the arrow 'b2', so that as the second inclined link groove 44*b* of the second hinge blade 22 moves to a direction of an arrow 'b3' from an imaginary line, the second hinge blade 22 moves to the 'folding position', together with the first hinge blade 21.

Contrarily, even if the second inclined link groove 44*b* of the second hinge blade 22 moves to the direction of the arrow 'b3', the first inclined link groove 44*a* of the first hinge blade 21 moves to the direction of the arrow 'b1' by means of the first and second link protrusions 41*a* and 41*b* of the link lever 41, and accordingly, the first hinge blade 21 does not move, together with the second hinge blade 22.

In FIGS. 7*a* and 7*b*, the first and second inclined link grooves 44*a* and 44*b* interlock with the link lever 41 with the first and second link protrusions 41*a* and 41*b* rotating in the direction of the arrow a2 or b2 and thus linearly move in the directions of the arrow a1 or b1 and the arrow a3 or b3 on the plane, but the first and second inclined link grooves 44*a* and 44*b* and the portions including them are curvedly formed in the rotating directions, so that the first and second hinge blades 21 and 22 having the first and second inclined link grooves 44*a* and 44*b* rotate to the 'folding position' or the 'unfolding position' along the semi-circular grooves 21*a* and 22*a* and the semi-circular protrusions 31*a* and 31*b* as the rotation-supporting structure.

The hinge device 14 of the present invention is configured to allow the free-stop function to be performed by the tension mechanism 50 when the rotating positions of the first and second bodies 11 and 12 are between the 'unfolding position' and the 'folding position'.

As shown in FIGS. 8 and 9, each tension mechanism 50 is configured to allow the tension guide protrusions 58*b* of the first and second tension blades 55 and 56 to be guided along the tension guide holes 58*a* of the first and second hinge blades 21 and 22, so that upon the rotations of the first and second hinge blades 21 and 22, the first and second tension blades 55 and 56 rotate interlockingly with the first and second hinge blades 21 and 22.

When the first and second hinge blades 21 and 22 are at the 'folding position' or the 'unfolding position', accordingly, the inclined protrusions 55*a* and 55*b* of the first and second tension blades 55 and 56 are fitted between the inclined protrusions 53*a* and 54*a* of the tension operating members 53 and 54 (See FIG. 11*a*), and the first and second springs 57*a* and 57*b* are expanded. As a result, the elastic forces of the first and second springs 57*a* and 57*b* for pressurizing the first and second hinge blades 21 and 22 toward the direction of the hinge axial line are reduced to allow the first and second hinge blades 21 and 22 to easily rotate with a small force.

When the first and second hinge blades 21 and 22 are between the 'folding position' and the 'unfolding position', further, the inclined protrusions 55*a* and 55*b* of the first and second tension blades 55 and 56 escape from the inclined protrusions 53*a* and 54*a* of the tension operating members 53 and 54 by the rotations of the first and second tension blades 55 and 56 to allow the tension operating members 53 and 54 to pressurizedly move in the direction of the hinge axial line (See FIG. 11*b*)

Accordingly, the tension operating members 53 and 54 move along the first and second guide shafts 52*a* and 52*b* to allow the first and second springs 57*a* and 57*b* to be compressed. As a result, the elastic forces of the first and second springs 57*a* and 57*b* for pressurizing the tension operating members 53 and 54 toward the first and second tension blades 55 and 56 are increased, and through the compressed elastic forces, accordingly, the free-stop function is performed to allow the first and second bodies 11 and 12 to be kept at the positions where the rotations are stopped.

The hinge device of the present invention may be applied to all kinds of devices having hinge structures such as laptop computers, in addition to the portable terminals such as smartphones.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention. Persons skilled in the relevant art can appreciate that many modifications and variations are possible in light of the above teachings. It is therefore intended that the scope of the invention be limited not by this detailed description, but rather by the claims appended hereto.

The invention claimed is:

1. A hinge device, comprising:

a housing positioned between one end of a first body and one end of a second body;

a first hinge blade and a second hinge blade fixed to the first body and the second body, respectively, and supported by the housing to rotate at a predetermined angle between an unfolded position in which the first body and the second body are placed on the same horizontal line and a folded position in which the first body and the second body face each other and come into contact with each other;

a link lever for interlocking the first hinge blade and the second hinge blade with each other so that the first hinge blade and the second hinge blade move relative to each other; and a tension mechanism comprising a tension fixing member having a first guide shaft and a second guide shaft disposed thereon in the direction of the hinge axial line, a first tension blade and a second tension blade fitted to the first guide shaft and the second guide shaft, rotating supportedly thereagainst, and movable to axial directions, tension operating members movably fitted to the first guide shaft and the second guide shaft in the axial directions, and elastic members for applying elastic forces to the tension operating members, wherein the first hinge blade and the second hinge blade have a first inclined link groove and a second inclined link groove formed on undersides thereof, and correspondingly thereto, the link lever has a first link protrusion and a second link protrusion formed on tops thereof, the link lever being disposed rotatably to a predetermined angle in the housing, and wherein a plurality of inclined protrusions are formed on the tension operating members in a circumferential direction around the first guide shaft and the second guide shaft, and another plurality of inclined protrusions that can be fitted corresponding to the inclined protrusions are formed on the first tension blade and the second tension blade.

2. The hinge device according to claim 1, wherein the first inclined link groove and second inclined link groove are rectangular inclinedly in the same directions as each other with respect to the rotation center of the corresponding link lever.

3. The hinge device according to claim 1, wherein the first inclined link groove and the second inclined link groove and portions on which the first inclined link groove and second inclined link groove are formed are curvedly formed toward the rotating directions of the first hinge blade and the second hinge blade.

4. The hinge device according to claim 1, wherein link lever has a shaft hole formed at the center thereof and thus fitted to a lever shaft formed on the housing so that the link lever is rotatable by the predetermined angle around the lever shaft.

5. The hinge device according to claim 1, wherein the first link protrusion and the second link protrusion become reduced in width toward tops thereof.

6. The hinge device according to claim 1, wherein a first pair of semi-circular protrusions and a second pair of semi-circular protrusions are formed on inner wall surfaces of both sides of the housing, and semi-circular grooves are formed on the first hinge blade and second hinge blade, respectively, to be rotated by fitting the semicircular protrusions thereto.

7. The hinge device according to claim 6, wherein the first pair of semi-circular protrusions and the second pair of semi-circular protrusions are spaced apart from each other by a predetermined distance to allow a predetermined curvature radius formed on a folding portion of a flexible display panel to be accommodated in the predetermined distance at the folding position.

8. The hinge device according to claim 1, wherein the tension mechanism has tension guide protrusions protruding from the first tension blade and the second tension blade, respectively, and the tension guide protrusions are inserted into and guided in rectangular tension guide holes formed on one side of the first hinge blade and second hinge blade.

9. The hinge device according to claim 1, further comprising elastic members elastically installed at interlocking portions between the first and the second hinge blade and the first and the second tension blade, and located furthest from the rotation axis of the first tension blade and the second tension blade.

* * * * *